(12) United States Patent
Jehlicka et al.

(10) Patent No.: US 10,337,869 B2
(45) Date of Patent: Jul. 2, 2019

(54) TRAIL INTERPOLATION

(71) Applicant: HERE GLOBAL B.V., Eindhoven (NL)

(72) Inventors: Prokop Jehlicka, Oberursel (DE); Daniel Rolf, Berlin (DE); Hilko Hofmann, Liederbach (DE); Björn Karge, Singapore (SG)

(73) Assignee: HERE Global B.V., Eindhoven (NL)

( * ) Notice: Subject to any disclaimer, the term of this patent is extended or adjusted under 35 U.S.C. 154(b) by 28 days.

(21) Appl. No.: 15/315,899

(22) PCT Filed: May 26, 2015

(86) PCT No.: PCT/IB2015/053939
§ 371 (c)(1),
(2) Date: Dec. 2, 2016

(87) PCT Pub. No.: WO2015/186020
PCT Pub. Date: Dec. 10, 2015

(65) Prior Publication Data
US 2017/0089707 A1 Mar. 30, 2017

(30) Foreign Application Priority Data
Jun. 3, 2014 (GB) .................................. 1409815.6

(51) Int. Cl.
*G01C 21/20* (2006.01)
*G01C 21/32* (2006.01)
(Continued)

(52) U.S. Cl.
CPC ............. *G01C 21/20* (2013.01); *G01C 21/16* (2013.01); *G01C 21/26* (2013.01); *G01C 21/32* (2013.01); *G08G 1/0112* (2013.01); *G01C 21/14* (2013.01)

(58) Field of Classification Search
CPC ........ G01C 21/20; G01C 21/16; G01C 21/26; G01C 21/32; G01C 21/14; G08G 1/0112
See application file for complete search history.

(56) References Cited

U.S. PATENT DOCUMENTS 6,167,360 A * 12/2000 Erickson ................ G05B 13/04
700/29
6,304,818 B1 10/2001 Kamiya
(Continued)

FOREIGN PATENT DOCUMENTS

EP 2570771 3/2013

OTHER PUBLICATIONS

Curves and Splines, Apr. 1, 2010, https://web.archive.org/web/20100401025649/http://www.cs.cmu.edu/afs/cs/academic/class/15462-s10/www/lec-slides/lec06.pdf, pp. 1-50 (Year: 2010).*
(Continued)

*Primary Examiner* — Thomas G Black
*Assistant Examiner* — Sze-Hon Kong
(74) *Attorney, Agent, or Firm* — Alston & Bird LLP

(57) ABSTRACT

A method comprising: collecting a plurality of probe data from a plurality of probe points by a probing device, said probe data comprising at least positional information, a speed vector and a direction of travel of the probing device and a timestamp of recording the probe data at a probe point; and estimating a trajectory of the probing device between two consecutive probe points as a cubic Hermite spline having the positions of said two consecutive probe points as control points and the speed vectors of said two consecutive probe points as control vectors.

20 Claims, 6 Drawing Sheets

(51) Int. Cl.
*G08G 1/01* (2006.01)
*G01C 21/16* (2006.01)
*G01C 21/26* (2006.01)
*G01C 21/14* (2006.01)

(56) References Cited

U.S. PATENT DOCUMENTS

| | | | | |
|---|---|---|---|---|
| 6,629,037 | B1* | 9/2003 | Nyland | G01V 1/3808 |
| | | | | 702/14 |
| 6,675,074 | B2* | 1/2004 | Hathout | B60K 28/165 |
| | | | | 342/357.31 |
| 2004/0006424 | A1* | 1/2004 | Joyce | G01S 5/0027 |
| | | | | 701/408 |
| 2008/0002190 | A1 | 1/2008 | Romain et al. | |
| 2008/0077283 | A1* | 3/2008 | Ueyama | G01C 21/26 |
| | | | | 701/1 |
| 2011/0172877 | A1* | 7/2011 | Dourra | F16H 59/52 |
| | | | | 701/33.4 |
| 2012/0214515 | A1* | 8/2012 | Davis | H04W 4/023 |
| | | | | 455/456.3 |
| 2012/0259547 | A1* | 10/2012 | Morlock | G01C 21/32 |
| | | | | 701/533 |
| 2013/0024249 | A1* | 1/2013 | Zohar | G06Q 10/06 |
| | | | | 705/13 |
| 2013/0197857 | A1* | 8/2013 | Lu | G01S 19/19 |
| | | | | 702/141 |
| 2013/0231825 | A1* | 9/2013 | Chundrlik, Jr. | B60W 50/0098 |
| | | | | 701/29.1 |
| 2014/0288870 | A1* | 9/2014 | Donaldson | G01P 21/00 |
| | | | | 702/104 |
| 2014/0350850 | A1* | 11/2014 | Kmiecik | G01C 21/005 |
| | | | | 701/487 |
| 2015/0120336 | A1* | 4/2015 | Grokop | B60W 40/09 |
| | | | | 705/4 |
| 2015/0284010 | A1* | 10/2015 | Beardsley | B60W 50/10 |
| | | | | 701/41 |
| 2015/0285656 | A1 | 10/2015 | Verheyen et al. | |
| 2015/0332494 | A1* | 11/2015 | Furukawa | G06T 17/00 |
| | | | | 345/419 |
| 2015/0355211 | A1* | 12/2015 | Mellars | G01N 35/04 |
| | | | | 436/47 |
| 2016/0011004 | A1* | 1/2016 | Matsumoto | G01C 21/16 |
| | | | | 702/96 |
| 2016/0098838 | A1* | 4/2016 | Minvielle-Larrousse | |
| | | | | G06T 7/0034 |
| | | | | 382/170 |
| 2017/0278400 | A1* | 9/2017 | Ferguson | G08G 1/166 |
| 2018/0025638 | A1* | 1/2018 | Fulger | G08G 1/096775 |
| 2018/0040250 | A1* | 2/2018 | Sawhill | G08G 5/0017 |

OTHER PUBLICATIONS

Polynomial Interpolation, Aug. 2, 2012, https://web.archive.org/web/20120802181547/http://www.nada.kth.se/kurser/kth/2D1213/05_06/utdelat/kap3.pdf, pp. 1-11 (Year: 2012).*

Hasberg, C. et al., *Integrating Spline Curves in Road Constraint Object Tracking*, Proceedings of the 11th International IEEE, Conference on Intelligent Transportation Systems, Oct. 12-15, 2008, 1009-1014.

Hintzen, N. et al., *Improved estimation of trawling tracks using cubic Hermite spline interpolation of position registration data*, Fisheries Research 101 (2010) 108-115.

International Search Report and Written Opinion for corresponding International Application No. PCT/IB2015/053939, dated Sep. 21, 2015.

Search Report for corresponding Great Britain Application No. 1409815.6 dated Nov. 27, 2014.

Sprunk, C. et al., *Improved Non-linear Spine Fitting for Teaching Trajectories to Mobile Robots*, Robotics and Automation (ICRA), 2012 IEEE International Conference, Retrieved from the internet: <URL: http://ais.informatik.uni-freiburg.de/publications/papers/sprunk12icra.pdf>, 6 pages.

* cited by examiner

Collect a plurality of probe data from probe points by a probing device, said probe data comprising at least positional information, a speed vector and a direction of travel of the probing device and a timestamp of recording the probe data at a probe point (300)

Estimate a trajectory of the probing device between two consecutive probe points as a cubic Hermite spline having the positions of said two consecutive probe points as control points and the speed vectors of said two consecutive probe points as control vectors (302)

Fig. 3

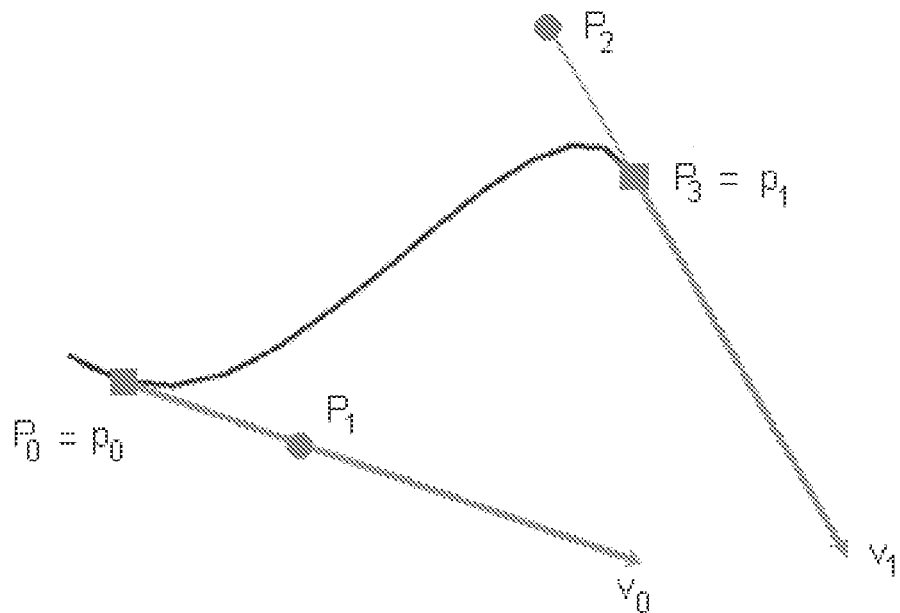

Fig. 4

TRAIL INTERPOLATION

FIELD OF THE INVENTION

The present invention relates to trails recorded by positional information devices, and more particularly to a process of interpolating said trails.

BACKGROUND OF THE INVENTION

Many modern navigation devices collect data such as geographic location, speed and direction of travel (heading). This data may be reported to certain service and/or data providers who may use the probe data, among other purposes, to evaluate changes in the road infrastructure. The same applies to certain mobile phones and other location-aware mobile computing devices with sufficient sensor and software equipment. This type of devices may thus be referred to as probing devices or probes.

However, the time interval between successively recorded probe data points often is found to be in the order of tens of seconds. As a result, two consecutive probe points of the recorded sequence may be geographically located rather far apart from each other. If no reference geometry for roads (or commonly used paths) is available, or if the available road geometry is possibly unreliable, data analysts frequently face the problem of estimating the missing data between such distant probe data points.

Straightforward linear interpolation of the reported probe points, as currently used, does not provide sufficient accuracy for estimating positions, if large sampling intervals are used. On a curvy road, simple linear interpolation inevitably leads to over-simplified angular trajectory estimations, which include positions outside the actual road segment. Likewise, basic spline interpolation methods that only incorporate positional information of the reported probe points are likely to fail, because the physical constraints of the vehicles are ignored. Also, when estimating plausible vehicle positions between two consecutive probe points, the common principles of road design should be taken into consideration.

SUMMARY OF THE INVENTION

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, a method according to the invention is based on the idea of collecting a plurality of probe data from a plurality of probe points by a probing device, said probe data comprising at least positional information, a speed vector and a direction of travel of the probing device and a timestamp of recording the probe data at a probe point; and estimating a trajectory of the probing device between two consecutive probe points as a cubic Hermite spline having the positions of said two consecutive probe points as control points and the speed vectors of said two consecutive probe points as control vectors.

According to an embodiment, for said probe points at a recording time of the probe data, the speed vector of the probing device is corresponded to a continuous first derivative of the trajectory of the probing device; and acceleration of the probing device is corresponded to a second derivative of the trajectory of the probing device, the second derivative having a continuous value.

According to an embodiment, jerk of the probing device is corresponded to a third derivative of the trajectory of the probing device, the third derivative having a continuous value.

According to an embodiment, the method further comprises determining a data set representing an estimate of an actual trajectory of the probing device on the basis of two or more consecutive probe points fulfilling a requirement of continuous value for said derivatives; and applying a polynomial interpolation of at least degree of five on said data set.

According to an embodiment, the method further comprises applying a further optimization method, such as steepest gradient descent or simulated annealing, for the data set.

According to an embodiment, the method further comprises providing a digital map comprising at least one road segment; and collecting said plurality of probe data from said plurality of probe points by a navigation device moving along said at least one road segment.

According to an embodiment, the method further comprises displaying the estimated trajectory of the navigation device and the digital map on a display of the navigation device.

According to an embodiment, the method further comprises calculating time, speed and/or distance information regarding the positional information and/or motion of the navigation device.

According to a second aspect, there is provided an apparatus comprising at least one processor, memory including computer program code, and a probe, the memory and the computer program code being configured to, with the at least one processor, cause the apparatus to at least: collect a plurality of probe data from a plurality of probe points by said probe, said probe data comprising at least positional information, a speed vector and a direction of travel of the probing device and a timestamp of recording the probe data at a probe point; and estimate a trajectory of the probing device between two consecutive probe points as a cubic Hermite spline having the positions of said two consecutive probe points as control points and the speed vectors of said two consecutive probe points as control vectors.

According to a third aspect, there is provided a computer readable storage medium stored with code thereon for use by an apparatus, which when executed by a processor, causes the apparatus to perform: collecting a plurality of probe data from a plurality of probe points by a probing device, said probe data comprising at least positional information, a speed vector and a direction of travel of the probing device and a timestamp of recording the probe data at a probe point; and estimating a trajectory of the probing device between two consecutive probe points as a cubic Hermite spline having the positions of said two consecutive probe points as control points and the speed vectors of said two consecutive probe points as control vectors.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a navigation device suitable to be used in a position estimation process according to an embodiment;

FIG. 3 shows a flow chart of a position estimation process according to an embodiment of the invention;

FIG. 4 shows an example of applying cubic Hermite splines according to an embodiment of the invention;

DESCRIPTION OF EMBODIMENTS

Figure 1:
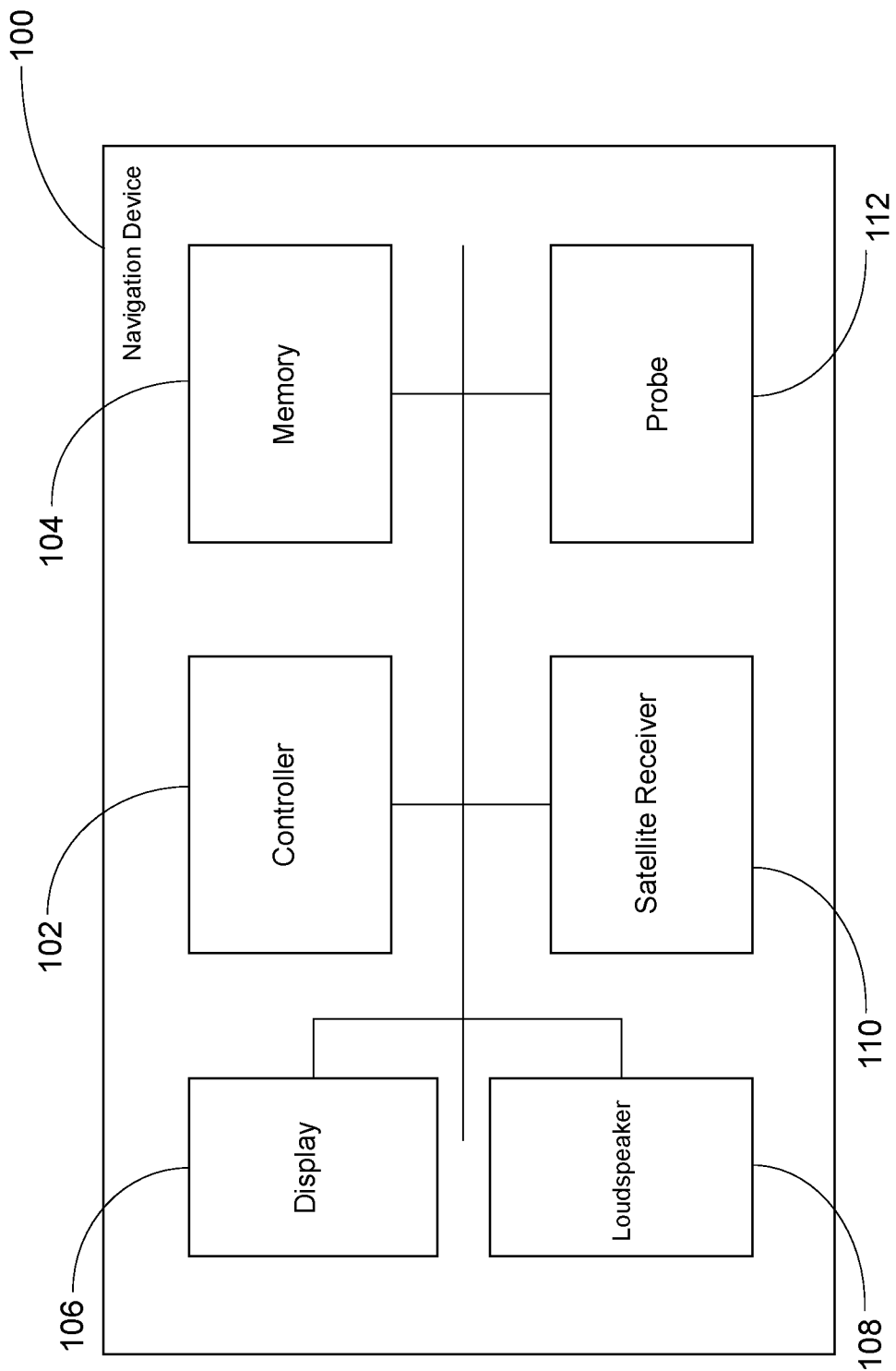

FIG. 1 shows a simplified block diagram of a navigation device suitable to be used in the embodiments, for example in a position estimation process according to an embodiment. The generalized structure of the navigation device will be explained in accordance with the functional blocks of the system. For a skilled man, it will be obvious that the simplified structure is only meant for illustrative purposes and that several functionalities can be carried out with a single physical unit, e.g. all calculation procedures can be performed in a single processor, if desired.

It is to be noted that while various embodiments herein below are described, for the sake of perspicuity, in connection with digital maps, the actual position estimation process is not dependent on any map data. Nevertheless, the results of the position estimation process may be applied, for example, to digital maps, aerial photographs, satellite images, etc.

Digital maps are used in various navigation devices. A navigation device may be included in a vehicle, either as integrated in the vehicle or as a portable vehicle navigation device detachably mounted on the vehicle. Alternatively, the navigation device may be implemented as functionality in a handheld device, such as in a PDA or a mobile phone with navigation software.

The navigation device 100 may comprise a controller 102 or processor for controlling the navigation device. The controller may be connected to at least one memory 104, which in embodiments of the invention may store both data in the form of image and audio data of digital maps and/or computer program instructions for implementation on the controller. The navigation device 100 typically comprises a display 106 for displaying the digital map on a screen, and a loudspeaker 108 for playing back audio guidance relating to navigation.

The digital map of a navigation device typically includes at least digital road segments intended to correspond to actual road segments. The digital map may further include information about the road segments, such as speed limits or points-of-interest, such as shops, office buildings or attractions along the road.

The navigation device typically includes a satellite receiver 110 and a probe 112. For example, Global Positioning System (GPS) provides a real-time spatial and time measurement of a location. A GPS receiver receives positioning signals from a plurality of satellites and the controller continuously calculates and updates the current location of the navigation device on the basis of the positioning signals. The functionalities of the probe are typically implemented as software. When travelling, the probe collects probe data, such as position, speed, direction of travel (heading), recording time and other data related to the travelling probe.

The probe may transmit or otherwise report its probe data at certain time segments. This may happen automatically, if agreed in the licensing terms of the hardware/software, or manually. The probe data may be reported, for example, to traffic surveillance authorities to analyze traffic and to create real time traffic information. The probe data may also be reported to the map provider who may use the probe data to evaluate changes in the road infrastructure. The map provider typically aims to maintain updated and accurate probe data for each digital road segment of the digital map.

Typical intervals between individual data points in reported probe data sets are about 5-30 seconds, corresponding to covered distances of about 40-1000 meters (40 m for intervals of 5 s at 30 km/h, 1000 m for intervals of 30 s at 120 km/h). This means that the distance between two individual probe points may be considerable. Therefore, it would be desirable to obtain information about the vehicle positions between two consecutive probe points, especially for display or measurement purposes.

When estimating plausible vehicle positions between two consecutive probe points, the common principles of road design have to be taken into consideration. The shape of public roads is usually subject to numerous physical and legal restrictions. One obvious restriction is the limitation of speed by curves: in the absence of cant (cross slope), a vehicle needs to drive the slower the smaller the radius of a curve is; otherwise it would risk losing traction. Conversely, a vehicle moving with a given velocity can only be driving through curves with great enough radius.

The geometry of modern roads is selected such that a driver moving with constant speed does not need to rotate the steering wheel too abruptly or too frequently, but rather constantly and smoothly. This is achieved by restricting the design elements to three types, namely line segments, circle segments, and clothoid segments. Then, a curve's apex is usually placed on a circle segment, and the transition to the curvature at the apex from the preceding road segment is implemented by a suitably chosen clothoid segment.

Figure 2:
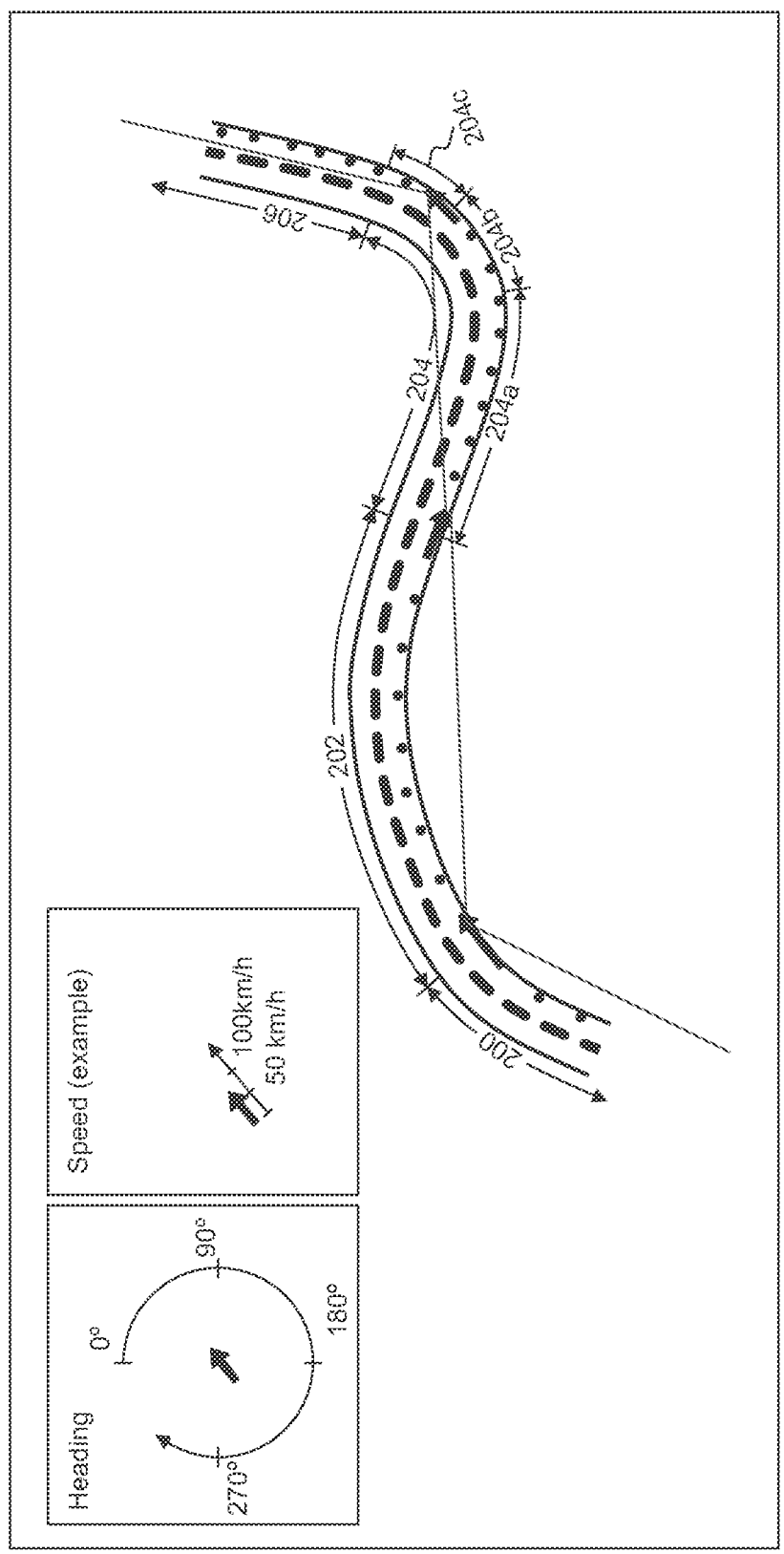
FIG. 2 shows an example of probe point locations on a road segment of a digital map.

The problems related to estimating plausible vehicle positions between two far apart probe points on various road segments are illustrated in FIG. 2. The exemplified stretch of a road shown in FIG. 2 consists of four segments: clothoid segment 200, circle segment 202, clothoid segment 204 and line segment 206. The clothoid segment 200 serves as a transition to the circle segment 202 providing the curvature to right. The next curvature turns to left, having even smaller radius of curve, and it is covered by the segment 204, which also provides the transition to the line segment 206. In practice, the segment 204 may be divided into three segments, a clothoid segment 204a, a small circle segment 204b and a clothoid segment 204c.

A vehicle equipped with a navigation device drives the stretch of the road arriving from the direction of the clothoid segment 200. The probe points at which the navigation device reports its probe data are shown by arrows representing a speed vector having direction (heading) and magnitude (speed represented by the length of the arrow). The probe points at which the navigation device does not measure and/or report the probe data are shown by dots.

As can be seen in FIG. 2, simple linear interpolation of the reported probe points (straight lines connecting the arrows) does not provide sufficient accuracy for estimating positions, if large sampling intervals are used. On a curvy road, simple linear interpolation inevitably leads to over-simplified angular trajectory estimations, which include positions outside the actual road segment. Likewise, any other interpolation method that only incorporates positional information of the reported probe points is likely to fail, because the physical constraints of the vehicles are ignored.

Moreover, the interpolation results would be different on every measuring event even if driven by the same vehicle, since the position of the first probe point to be used would be randomly selected. In a similar way, a navigation device in a vehicle driving the stretch of road to the opposite direction would obtain different interpolation results for the stretch of the road, the interpolation results also varying between the measuring events.

Some interpolation methods use splines to interpolate a track with the control points derived solely from the probe point positions in order to create a smooth path through the probe points. Such methods are referred herein as basic spline interpolation methods. Even though a smooth shape of the trajectory is achieved, the resulting trajectory does not necessarily reflect the realistic shape of a road segment, especially in city environment having mainly orthogonal road crossings or on very curvy roads.

Assuming that the probe track has been created by a vehicle that drove within restraints of physics, the interpolation methods described above produce a shape which does not necessarily meet the restraints and which is thus physically not drivable.

Now in order to provide more accurate estimations of vehicle positions, a new method is now presented for estimating plausible vehicle positions on the basis of probe data.

The method according to an embodiment is illustrated in FIG. 3. In the method of FIG. 3, a probing device collects (300) a plurality of probe data from a plurality of probe points, said probe data comprising at least positional information, a speed vector and a direction of travel of the probing device and a timestamp of recording the probe data at a probe point. A trajectory of the probing device between two consecutive probe points is then estimated (302) as a cubic Hermite spline having the positions of said two consecutive probe points as control points and the speed vectors of said two consecutive probe points as control vectors.

Herein, cubic Hermite splines are used for interpolation of adjacent road parts between two consecutive probe points to obtain a smooth continuous function. Actually, the values for the speed and the direction of travel of the navigation device correspond to the first derivative p'(t) of the trajectory p(t) of the navigation device at a recording time t (i.e. timestamp). Cubic Hermite splines are generally defined by cubic polynomials with coefficients determined by two control points and two control vectors. Choosing the control points as the positions of two consecutive probe points and the control vectors as the respective speed vectors (in the direction of travel) results in a trajectory geometry, which is smooth (i.e., it has a continuous tangent normal vector throughout the trajectory).

Referring to FIG. 4, consider a time interval $t_0 \ldots t_1$ ($t_0 < t_1$) and a parametric curve p(t) whose first derivative p'(t) is defined everywhere on the interval $t_0 \ldots t_1$, where p corresponds to the actual probe trajectory. Then we define the positive value $\Delta t = t_1 - t_0$ and the points $p_0 = p(t_0)$ and $p_1 = p(t_1)$ and the vectors $v_0 = p'(t_0)$ and $v_1 = p'(t_1)$. Then, the cubic Hermite spline interpolation between the points $p_0$, $p_1$ is defined for every value t from $t_0$ to $t_1$ as $$H(t) = p_0 + (p_1 - p_0)(3(t-t_0)^2/\Delta t^2 - 2(t-t_0)^3/\Delta t^3) + v_0(t-t_0) + (v_0+v_1)(t-t_0)^3/\Delta t^2 - (v_1+2v_0)(t-t_0)^2/\Delta t$$

wherein the control points for the corresponding cubic Bezier curve yield as $P_0 = p_0$, $P_1 = p_0 + v_0/3$, $P_2 = p_1 - v_1/3$, $P_3 = p_1$.

Simple algebra yields as first derivatives $H'(t_0) = v_0$ and $H'(t_1) = v_1$, corresponding to the punctual speed vectors at times $t_0$ and $t_1$, respectively, wherein the interpretation of such speed vector v being that given a point q, it takes 1 unit of time with respect to the parameterization of H to travel from q to q+v at the speed defined by v.

Given point p with a recorded speed s in units of km/h and a recorded heading $\alpha$ in units of clockwise angular degrees from north (i.e. $0 \leq \alpha < 360$, $\alpha = 0$ meaning northbound, $\alpha = 90$ meaning eastbound, $\alpha = 180$ meaning southbound, and $\alpha = 270$ meaning westbound), and assuming a local coordinate system with unit vectors of one kilometer at p with the property that the vectors (0,1) and (1,0) point north and east, respectively, and assuming that the unit of time (as used for the parameterization of H) is one hour, the speed vector v at p then computes as $v = s \cdot (\sin(\alpha), \cos(\alpha))$.

Likewise, if the unit of parameterization of H was one second, and the coordinate system had unit vectors of length one meter, v would compute as $v = 1/3600 \cdot s \cdot (\sin(\alpha), \cos(\alpha)) \cdot 1000$.

Since the latitude/longitude coordinate system of the earth is distorting actual distances, additional adjustments need to be made. For simple use cases, it is sufficient to choose a coordinate system local to $(p_0 + p_1)/2$ with unit vectors of length 1 km. For many practical purposes this may be achieved by the transformation $$x(\text{lon}) = ce/360 \cdot \text{lon} \cdot \cos((\text{lat}_0 + \text{lat}_1)/2)$$

$$y(\text{lat}) = ce/360 \cdot \text{lat}$$

wherein ce is the circumference of Earth (in kilometers), and $\text{lat}_0$ and $\text{lat}_1$ being the latitudes (in angular degrees) of $p_0$ and $p_1$, respectively). The interpolated points then need to be transformed back using the inverse mapping $$\text{lat}(t) = 360/ce \cdot y(t)$$

$$\text{lon}(t) = 360/ce \cdot x(t)/\cos((\text{lat}_0 - \text{lat}_1)/2)$$

The interpolated speed and heading values s(t) and $\alpha(t)$ are determined by the first derivative of the cubic Hermite spline function $$v(t) = H'(t) = (p_1 - p_0)(6(t-t_0)/\Delta t^2 - 6(t-t_0)^2/\Delta t^3) + (v_0 + v_1)3(t-t_0)^2/\Delta t^2 - (v_1 + 2v_0)2(t-t_0)/\Delta t + v_0$$

as the Euclidean length of v(t) (assuming that H is parameterized by units if 1 hour and assuming that unit vectors have a length of 1 km) and the clockwise angle between v(t) and the positive y axis, respectively.

The principles of modern road design also set some physical requirements for plausible trajectories. It can be concluded that for a vehicle comprising a navigation device moving along a real-life road segment:
1) The navigation device position p(t) should be continuous and sampled by probe points.
2) The navigation device speed p'(t) should be continuous and sampled by probe points.

Moreover, the values for the acceleration and the jerk (or jolt) of the navigation device can be regarded as the second derivative p''(t) and the third derivative p'''(t), correspondingly, of the trajectory p(t) of the navigation device at a recording time t.

It can be further concluded that road design principles set constraints for these parameters as follows:
3) The navigation device acceleration p''(t) should be continuous 4) The navigation device jerk p'''(t) should ideally be continuous, especially at high speeds.

Moreover, the principles of modern road design support constant jerk most of the time, because the traversal of clothoid segments at constant absolute speed result in linear changes of transversal acceleration.

Thus, according an embodiment, for said probe points at a recording time of the probe data, the speed vector of the probing device is corresponded to a continuous first derivative of the trajectory of the probing device; and acceleration of the probing device is corresponded to a second derivative of the trajectory of the probing device, the second derivative having a continuous value.

According to a further embodiment, jerk of the probing device is corresponded to a third derivative of the trajectory of the probing device, the third derivative having a continuous value.

However, due to the nature of cubic polynomials, trajectories modelled by cubic Hermite spline interpolations between probe points usually will not satisfy the constraints 3) and/or 4) above. This means that the method above may not always provide sufficient accuracy of estimating positions for calculating accurate timing information regarding the positional information and/or motion of the navigation device. Nevertheless, the results are sufficient for visualization purposes, i.e. for displaying the trajectory on a digital map.

More precisely, polynomials including cubic polynomials, such as cubic Hermite splines, are fully determined by their derivatives at any given point. Therefore, cubic polynomials are insufficient to implement both, the aforementioned continuity criteria and the free choice of control point positions and speeds as (by continuity) these would already be fully determined by the position, speed, acceleration and jerk at the first control point. In other words, acceleration and jerk of a trajectory estimated using cubic Hermite spline interpolation will usually not be continuous at the positions of the probe data points where adjacent interpolated segments meet.

Therefore, in order to allow position and speed to be chosen arbitrarily, while warranting continuity of at least the second, and possibly the third derivative, polynomials of higher degree may be applied. The requirement of continuity of the second derivative for polynomials of degree 4 will result in a solution unique up to a single real parameter. This is contrary to the large degree of freedom in determining the shape of roads. Therefore, if the continuity of the second derivative is desired, it is preferable to apply only interpolating polynomials of degree of 5 or higher, and if the continuity of the third derivative is desired, it is preferable to apply interpolating polynomials of degree 6 or higher.

According to an embodiment, in order to implement the physically reasonable requirement of continuity of the second derivative, and to enhance the accuracy of estimating positions, the method further comprises determining a data set representing an actual trajectory of the probing device on the basis of two or more consecutive probe points fulfilling a requirement of continuous value for said derivatives; and applying a polynomial interpolation of at least degree of five on said data set.

Herein, the four constraints defined above may be formulated in four equations, which all should fulfil the physical requirements of the plausible trajectory. Choosing an interpolating polynomial of degree 5 or higher allows deriving an analytic solution of the system of equations defined by the constraints (1) to (3). Similarly, choosing an interpolating polynomial of degree 6 or higher allows deriving an analytic solution of the system of equations defined by the constraints (1) to (4). The analytic solution may have additional degrees of freedom which may be used for further adjustments.

For example, consider recorded probe positions $p_0$, $p_1$ with respective recording times $t_0$, $t_1$, recorded velocities $v_0$, $v_1$ and assumed acceleration values $a_0$, $a_1$. For convenience, degree 5 Bernstein polynomials can be used for the definition of an interpolating polynomial q(t) of degree 5:

$$q(t)=b_{[0,5]}((t-t0)/\Delta t)\cdot A+b_{[1,5]}((t-t0)/\Delta t)\cdot B+b_{[2,5]}((t-t0)/\Delta t)\cdot C+b_{[3,5]}((t-t0)/\Delta t)\cdot D+b_{[4,5]}((t-t0)/\Delta t)\cdot F+b_{[5,5]}((t-t0)/\Delta t)\cdot G$$

wherein the expression $b_{[k,n]}(t)=t^k\cdot(1-t)^{n-k}n!/k!/(n-k)!$ (i.e., the value of t raised to the k-th power multiplied by the value of (1-t) raised to the (n-k)-th power and multiplied by the binomial coefficient of n over k) is well known as the k-th Bernstein basis polynomial of degree n. Then, the following system of equations $$q(t_0)=p_0,\ q(t_1)=p_1,\ q'(t_0)=v_0,\ q'(t_1)=v_1,\ q''(t_0)=a_0, q''(t_1)=a_1$$

has the solutions $$A=p_0,\ B=p_0+\Delta t\cdot v_0/5,\ C=p_0+\Delta t 2v_0/5+\Delta t^2\cdot a_0/20$$

$$G=p_1,\ F=p_1-\Delta t\cdot v_1/5,\ D=p_1-\Delta t\cdot 2v_1/5+\Delta t^2\cdot a_1/20$$

Then, by way of example, assigning $a_1=(v_1-v_0)/\Delta t$ and choosing $a_0$ as the value of $a_1$ from the preceding segment (and $a_0=0$ for the first segment in the recording sequence, or simply skipping the first segment) completely defines the degree 5 polynomials used for the interpolation.

A possible shortcoming with this approach is the occurrence of loops or bulges in places where the time between two probe points would allow for a much slower deceleration than actually happened.

According to an embodiment, this can be largely remedied by separating treatment for directional and absolute acceleration. According to an alternative embodiment, enough degrees of freedom may be introduced to the heuristic initial solution of the polynomial interpolation such that the result can be further fine-tuned.

According to an embodiment, a further optimization method, such as steepest gradient descent or simulated annealing, may be applied for the data set such that the requirement of continuous value for all of the first, second and third derivative is fulfilled.

Herein, starting from the heuristic initial solution with shortcomings but available degrees of freedom, such as degrees of freedom provided by one of the previous approach, or any other heuristic method, a further optimization method, such as steepest gradient descent or simulated annealing, may be used to tune the free variables until all constraints are met. Thereby, we can incorporate additional constraints, which eliminate the loops and bulges of the previous approach.

For example, a common reason for the aforementioned loops and bulges are probe data point omitted in the recording because they have zero velocity. One way of identifying these situations is to determine whether the time interval between successive probe data points is unusually long, or if the speed of the estimated trajectory is slow in regions with notable transversal acceleration, or both.

In this case, the duration of the suspicious probe data interval may be introduced as a degree of freedom for an optimization process. Then the variance of the speed of the resulting estimated trajectory may be defined as cost function for the optimization process. As an initial value, for example, the minimum duration of the adjacent intervals may be used. Then, the optimization process may be run and terminated, for example, when the optimized duration value matches the duration of the adjacent recording segments, or when the variance of speed of the optimized recording segment is sufficiently small.

In order to compensate for the time difference, the resulting trajectory may then be re-parameterized with a sufficiently smooth "stopover profile" function that first reduces the traversal speed to zero, then keeps it at zero for some time and then increases it again to the original speed. For example, a simple "stopover profile" may be the function $s_{d,z,a}(t)$ as defined by $$s_{d,z,a}(t) = \begin{cases} (\pi t + d \cdot \sin(\pi t/d))/2\pi, & \text{if } 0 \leq t < d \\ d/2, & \text{if } d \leq t < d+z \\ d/2 + \left( \dfrac{\pi(t-d-z) - a \cdot}{\sin(\pi(t-d-z)/a)} \right)/2\pi, & \text{if } d+z \leq t < d+z+a \\ t-d-a-z, & \text{otherwise} \end{cases}$$

$s_{d,z,a}(t)$ would stretch any interval larger than $d/2+a/2$ by the time $d/2+z+a/2$, d and a being deceleration and acceleration time, respectively, and z being the length of the zero velocity phase. In this example, the "stopover profile" function also controls the absolute acceleration, whereas the direction of acceleration is fixed by the curve parameters determined prior to the optimization process.

It should be noted that the further optimization methods described above may be applied even if no cubic Hermite spline calculations and/or polynomial interpolation are available. For example, a linear interpolation of speed, heading and position values may first be performed to generate a sufficient number of intermediate synthetic sampling probe points. Then a further optimization method, such as simulated annealing, may be used to adjust the positions and synthesized data of the synthetic points until they meet the constraints imposed by physics and/or road construction principles.

According to an embodiment, a digital map comprising at least one road segment may be provided in a navigation device, and said plurality of probe data from said plurality of probe points may be collected by the navigation device moving along said at least one road segment. Thus, the probing device may be implemented as a navigation device, which may naturally refer to a handheld device comprising navigation functionality.

According to an embodiment, the estimated trajectory of the navigation device and the digital map may be displayed on a display of the navigation device. The enhanced interpolation method introduced hereinabove creates more realistic and plausible estimations of a trajectory of the navigation device, which can then be illustrated on the display of the navigation device.

According to an embodiment, time, speed and/or distance information may be calculated regarding the positional information and/or motion of the navigation device. Owing to the more realistic and plausible estimations of a trajectory of the navigation device, also time, speed and/or distance information from the trajectory may be calculated more reliably, especially between the locations of the recorded probe points.

A skilled man appreciates that any of the embodiments described above may be implemented as a combination with one or more of the other embodiments, unless there is explicitly or implicitly stated that certain embodiments are only alternatives to each other.

Figure 5A:
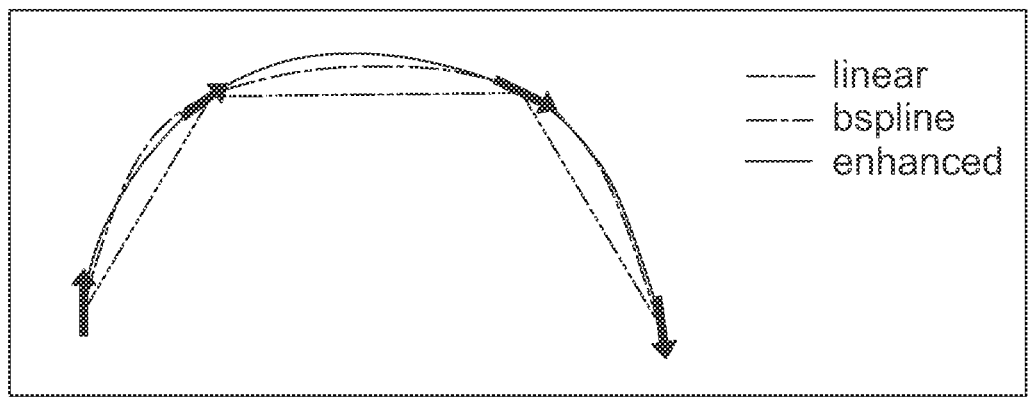
FIGS. 5a-5d illustrate examples comparing prior known interpolation methods and the enhanced interpolation method according to an embodiment of the invention.

FIGS. 5a-5d illustrate examples comparing the prior known linear and basic spline interpolation methods and the enhanced interpolation method introduced hereinabove. As can be seen in FIG. 5a, the linear interpolation method provides over-simplified angular trajectory estimation, where the trajectory rather poorly follows the actual road segment. On a steadily curving road segment, such as in the example of FIG. 5a, the basic spline interpolation method follows the actual road segment nearly as well as the enhanced interpolation method.

Figure 5B:
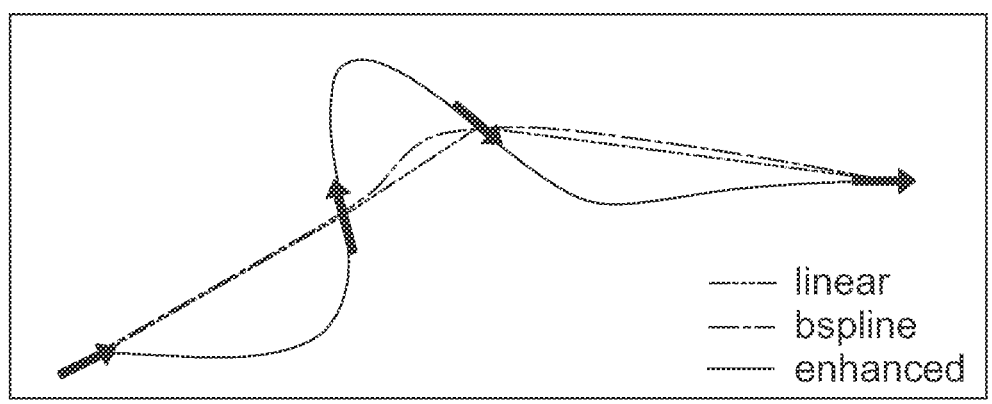
Figure 5C:
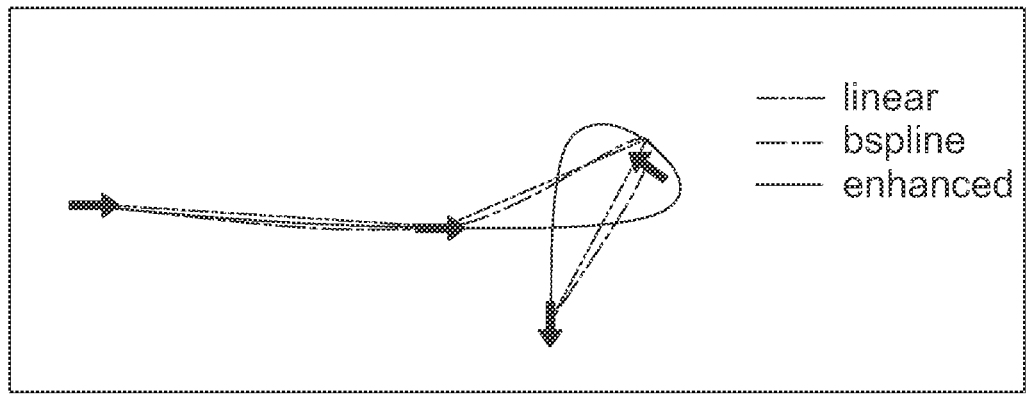

However, on more abruptly curving road segments, such as in the examples of FIGS. 5b and 5c, both the linear and the basic spline interpolation methods provide trajectories, which cannot follow the curvature at all and which violate many physical constrains of both a driving vehicle and the road design. In both examples, the enhanced interpolation method creates a trajectory, which is plausible in terms of physical constrains of both a driving vehicle and the road design and which follows very well the actual road segment.

Figure 5D:
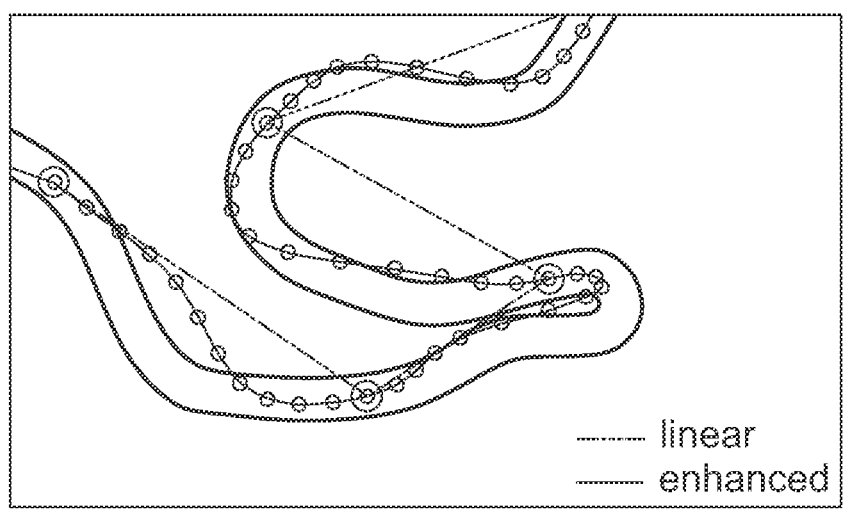

FIG. 5d illustrates a further example of interpolation method comparison on an extremely curvy mountain road segment. It is evident that such a road segment is very challenging in terms interpolating the trajectory. Again, the linear interpolation method provides angular trajectory estimation, where the trajectory does not follow the actual road segment at all. The enhanced interpolation method, in turn, creates a trajectory, which is reflects the actual road segment rather well, even if some probe point estimations fall outside the actual road.

Figure 6:
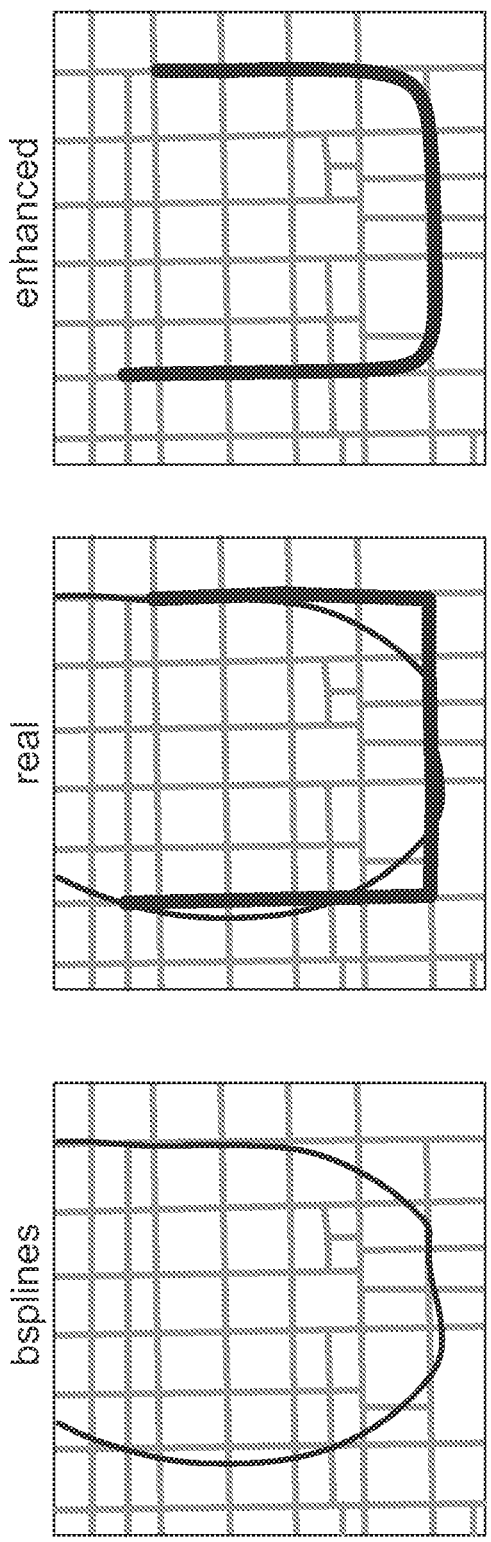
FIG. 6 illustrates an example of estimating public transportation trajectories in a city area according to an embodiment of the invention.

FIG. 6 illustrates an example of estimating public transportation trajectories in a city area, where the straight lines represent streets of a city, herein an overlay of some Chicago streets.

In the middle image, a real trajectory of a public transportation line is shown. In the left-hand image, a trajectory estimated by the bspline method is shown. As can be seen, the estimated trajectory does not follow the actual streets or other physical restraints of city environment, but rather provides a trajectory estimated, which is physically not drivable. The enhanced interpolation method, in turn, creates a trajectory, which is reflects the real trajectory of a public transportation line very well, even taking the orthogonal turns in street crossroads into consideration rather well.

As confirmed by the experiments and the examples shown in FIGS. 5 and 6, the various embodiments may provide advantages over state of the art. In a road turn, tracks estimated according to the enhanced interpolation method are less distributed and usually create a shape that matches much better with the actual road shape. Reducing the transverse displacement of the tracks increases the effectiveness of a routing algorithm. Furthermore, the enhanced interpolation method allows better digitization of a road network where probe points are provided sparsely and where the probe point's heading provides more information than can be deduced from neighbouring probe points of other tracks. Furthermore, the two approaches using restrictions of driving physics (iterative and analytic interpolation) provide a realistic behaviour, how a vehicle could be driving to produce the given sequence of probe points.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the apparatus to carry out the features of an embodiment.

It is obvious that the present invention is not limited solely to the above-presented embodiments, but it can be modified within the scope of the appended claims.

The invention claimed is:

1. A method comprising:
   collecting a plurality of probe data from a plurality of probe points by a probing device of a navigation device moving along at least one road segment, said probe data comprising at least positional information, a speed vector and a direction of travel of the probing device and a timestamp of recording the probe data at a probe point, wherein for said probe points at a recording time of the probe data, the speed vector of the probing device corresponds to a continuous first derivative of a trajectory of the probing device and acceleration of the probing device corresponds to a second derivative of the trajectory of the probing device with the second derivative having a continuous value;
   estimating a trajectory of the probing device between two consecutive probe points by determining a data set representing an estimate of an actual trajectory of the probing device on the basis of two or more consecutive probe points fulfilling a requirement of continuous values for the first and second derivatives of the trajectory of the probing device and applying a polynomial interpolation of at least degree of five on said data set;
   providing a digital map comprising the at least one road segment; and
   displaying the estimated trajectory of the probing device of the navigation device along with the digital map on a display of the navigation device.

2. The method according to claim 1, wherein:
   jerk of the probing device is corresponded to a third derivative of the trajectory of the probing device, the third derivative having a continuous value.

3. The method according to claim 1, the method further comprising:
   applying a further optimization method for the data set.

4. The method according to claim 3, wherein the optimization method comprises at least one of steepest gradient descent or simulated annealing.

5. The method according to claim 3, wherein the optimization method comprises reparametrizing the trajectory with a stopover profile.

6. The method according to claim 1, further comprising calculating time, speed and/or distance information regarding the positional information and/or motion of the navigation device.

7. The method according to claim 1 further comprising applying an optimization method for the data set in which a duration of a probe data interval serves as a degree of freedom for the optimization method and a variance of the speed of the estimated trajectory is defined as a cost function of the optimization method.

8. The method according to claim 1 further comprising re-parameterizing the estimated trajectory in accordance with a stopover profile function that first reduces a traversal speed to zero and then maintains the traversal speed at zero for a period of time prior to increasing the traversal speed again to an original speed.

9. The method according to claim 1 wherein the estimated trajectory of the probing device is illustrated on the digital map on the display of the navigation device.

10. An apparatus comprising at least one processor, memory including computer program code, and a probing device of a navigation device, the memory and the computer program code being configured to, with the at least one processor, cause the apparatus to at least:
    collect a plurality of probe data from a plurality of probe points by said probing device of the navigation device moving along at least one road segment, said probe data comprising at least positional information, a speed vector and a direction of travel of the probing device and a timestamp of recording the probe data at a probe point, wherein for said probe points at a recording time of the probe data, the speed vector of the probing device corresponds to a continuous first derivative of a trajectory of the probing device and acceleration of the probing device corresponds to a second derivative of the trajectory of the probing device with the second derivative having a continuous value;
    estimate a trajectory of the probing device between two consecutive probe points by determining a data set representing an estimate of an actual trajectory of the probing device on the basis of two or more consecutive probe points fulfilling a requirement of continuous values for the first and second derivatives of the trajectory of the probing device and applying a polynomial interpolation of at least degree of five on said data set;
    provide a digital map comprising the at least one road segment; and
    display the estimated trajectory of the probing device of the navigation device along with the digital map on a display of the navigation device.

11. The apparatus according to claim 10, wherein:
    jerk of the probing device is configured to correspond to a third derivative of the trajectory of the probing device, the third derivative having a continuous value.

12. The apparatus according to claim 10, the memory and the computer program code being configured to, with the at least one processor, cause the apparatus to at least:
    apply a further optimization method for the data set.

13. The apparatus according to claim 12, wherein the optimization method comprises at least one of steepest gradient descent or simulated annealing.

14. The apparatus according to claim 12, wherein the optimization method comprises reparametrizing the trajectory with a stopover profile.

15. The apparatus according to claim 10, wherein the memory and the computer program code being configured to, with the at least one processor, cause the apparatus to at least:
    calculate time, speed and/or distance information regarding the positional information and/or motion of the navigation device.

16. The apparatus according to claim 10 wherein the memory and the computer program code are further configured to, with the at least one processor, cause the apparatus to apply an optimization method for the data set in which a duration of a probe data interval serves as a degree of freedom for the optimization method and a variance of the speed of the estimated trajectory is defined as a cost function of the optimization method.

17. The apparatus according to claim 10 wherein the memory and the computer program code are further configured to, with the at least one processor, cause the apparatus to re-parameterize the estimated trajectory in accordance with a stopover profile function that first reduces a traversal speed to zero and then maintains the traversal speed at zero for a period of time prior to increasing the traversal speed again to an original speed.

18. A non-transitory computer readable storage medium stored with code thereon for use by an apparatus, which when executed by a processor, causes the apparatus to perform:

collecting a plurality of probe data from a plurality of probe points by a probing device of a navigation device moving along at least one road segment, said probe data comprising at least positional information, a speed vector and a direction of travel of the probing device and a timestamp of recording the probe data at a probe point, wherein for said probe points at a recording time of the probe data, the speed vector of the probing device corresponds to a continuous first derivative of a trajectory of the probing device and acceleration of the probing device corresponds to a second derivative of the trajectory of the probing device with the second derivative having a continuous value;

estimating a trajectory of the probing device between two consecutive probe points by determining a data set representing an estimate of an actual trajectory of the probing device on the basis of two or more consecutive probe points fulfilling a requirement of continuous values for the first and second derivatives of the trajectory of the probing device and applying a polynomial interpolation of at least degree of five on said data set;

providing a digital map comprising the at least one road segment; and displaying the estimated trajectory of the probing device of the navigation device along with the digital map on a display of the navigation device.

19. The computer readable storage medium according to claim 18 wherein the code, when executed by a processor, causes the apparatus to additionally perform applying an optimization method for the data set in which a duration of a probe data interval serves as a degree of freedom for the optimization method and a variance of the speed of the estimated trajectory is defined as a cost function of the optimization method.

20. The computer readable storage medium according to claim 18 wherein the code, when executed by a processor, causes the apparatus to additionally perform re-parameterizing the estimated trajectory in accordance with a stopover profile function that first reduces a traversal speed to zero and then maintains the traversal speed at zero for a period of time prior to increasing the traversal speed again to an original speed.

* * * * *